(12) United States Patent
Hess et al.

(10) Patent No.: US 6,979,052 B2
(45) Date of Patent: Dec. 27, 2005

(54) ENERGY ABSORPTION BRACKET (75) Inventors: Travis Hess, Farr West, UT (US); Kurt Kottke, Bountiful, UT (US); Corey Farnsworth, Kaysville, UT (US); Thomas C. Burton, Salt Lake City, UT (US); Jesse Crookston, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 22 days.

(21) Appl. No.: 10/658,681

(22) Filed: Sep. 9, 2003

(65) Prior Publication Data
US 2005/0052054 A1    Mar. 10, 2005

(51) Int. Cl.⁷ ............................................. B50R 21/04
(52) U.S. Cl. ........................... 296/187.05; 296/187.09; 188/377
(58) Field of Search ....................... 296/187.03, 187.05, 296/187.09, 187.1; 188/371, 376, 377; 280/748

(56) References Cited

U.S. PATENT DOCUMENTS

| | | | | |
|---|---|---|---|---|
| 3,773,373 A | * | 11/1973 | McLauchlan | 293/135 |
| 5,163,730 A | * | 11/1992 | Welch | 296/187.05 |
| 5,544,933 A | | 8/1996 | Shahab et al. | |
| 5,564,744 A | * | 10/1996 | Frost | 280/751 |
| 5,575,500 A | * | 11/1996 | Mimura et al. | 280/751 |
| 5,609,385 A | | 3/1997 | Daniel et al. | |
| 5,720,510 A | | 2/1998 | Daniel et al. | |
| 5,729,463 A | | 3/1998 | Koenig et al. | |
| 5,884,962 A | | 3/1999 | Mattingly et al. | |
| 6,145,908 A | | 11/2000 | Deb et al. | |
| 6,254,172 B1 | | 7/2001 | Takahara | |
| 6,340,200 B1 | * | 1/2002 | Enomoto et al. | 296/187.09 |
| 6,394,536 B2 | | 5/2002 | Takahara | |
| 6,467,834 B1 | | 10/2002 | Barz et al. | |
| 6,779,835 B2 | * | 8/2004 | Fox et al. | 296/187.05 |
| 2001/0008915 A1 | | 7/2001 | Hirata et al. | |
| 2002/0057003 A1 | | 5/2002 | Yoshida et al. | |
| 2002/0145298 A1 | | 10/2002 | Williams et al. | |

FOREIGN PATENT DOCUMENTS

| | | |
|---|---|---|
| GB | 2 382 805 A | 6/2003 |
| JP | 7 228 201 | 8/1995 |
| JP | 11-123993 | 5/1999 |
| WO | WO 03/089273 A1 | 10/2003 |

* cited by examiner

*Primary Examiner*—Joseph D. Pape
(74) *Attorney, Agent, or Firm*—Sally J. Brown (57) ABSTRACT An energy-absorbing bracket is disclosed for use in a vehicle to absorb the impact of a vehicle occupant with an interior surface of the vehicle such as a vehicular pillar, an interior trim panel, and other potential areas of contact. The brackets of the invention generally include an anchor plate configured to allow attachment of the bracket to a surface, an extension arm extending from the anchor plate; and a support foot linked to the extension arm. The energy-absorbing brackets of the invention are generally incompletely tubular in nature, and configured to deform when impacted to dissipate impact energy and assume a configuration adapted to absorb additional impact energy.

18 Claims, 5 Drawing Sheets

ENERGY ABSORPTION BRACKET

BACKGROUND OF THE INVENTION

1. Field of the Invention

The present invention relates to energy absorbing structures used in automotive safety applications. More specifically, the present invention relates to structures used in interior panels in a vehicle to absorb impact energy.

2. Description of Related Art

Modern motor vehicles are outfitted with arrays of devices designed to protect a vehicle occupant from injury during a collision event. A primary line of defense has been traditionally provided by seatbelts installed during production of the vehicle and worn by the occupant during operation of the vehicle. This mechanism has been supplemented by a family of passive restraint mechanisms such as airbags, inflatable bolsters, and automatic seatbelts which may operate successfully substantially without the occupant's intervention. These devices act to restrain a vehicle occupant, decelerate an occupant during a collision event, and prevent or minimize the impact of a vehicle occupant with an interior surface of a vehicle.

In recent years, efforts have been made to engineer interior surfaces themselves to protect occupants of the vehicle. Specifically, many of the interior surfaces of vehicles and the structures that support them are being designed to absorb impact energy in order to reduce the potential injury to an occupant striking the surfaces. One particular group of interior structures which has drawn attention in these efforts is the set of structural pillars which encompass the passenger compartment of a vehicle. These structures are generally designed to support the roof and windows of a vehicle. In addition, the pillars combine with other structural elements of the vehicle frame to form a rigid, protective structure often termed a "safety cage" around the vehicle occupant. This structure protects the occupant during collisions by absorbing impacts and remaining intact around the occupant.

Structural pillars can be a cause for concern in large part due to their placement in a vehicle. More specifically, pillars are often present in front of vehicle occupants, generally at the level of the upper body and head. This often places the pillars in the path of an occupant during a collision event, and creates a risk of injury for the occupant during a collision. As a result of this, pillar designs have been adopted which use a variety of structures designed to absorb the impact of the head and/or upper body of a vehicle occupant. One family of these structures includes energy-absorbing brackets placed on an interior-facing portion of the pillar. These brackets generally absorb energy by collapsing or deforming when a force is exerted upon them. Energy-absorbing brackets such as those described are produced of a variety of materials, including various metals and plastics, and in some cases, energy absorbing fluid compounds. Various designs for brackets have been produced which are configured to deform or collapse upon impact to reduce injury to the occupant.

Many of the energy-absorbing brackets commonly used in the art rely on the use of an interior hollow compartment. In many cases, these hollow compartments are constructed of multiple panels produced individually and subsequently attached together and mounted to the vehicle. Some designs use multiple individual internal hollow bodies integrated and assembled to include structures allowing attachment to a vehicle pillar. Such designs are often complex in nature, and thus may often be expensive to produce and install.

SUMMARY OF THE INVENTION

The apparatus of the present invention has been developed in response to the present state of the art, and in particular, in response to the problems and needs in the art that have not yet been fully solved by currently available energy-absorbing brackets. Thus, the present invention provides energy-absorbing brackets for use in a panel of a vehicle such as a vehicle pillar to absorb energy from an impact.

In accordance with the invention as embodied and broadly described herein in the preferred embodiment, energy-absorbing brackets are provided. According to one configuration, the energy-absorbing bracket may comprise an anchor plate, an extension arm continuous with and extending from the anchor plate, and a support foot linked to the extension arm by a flex region and positioned adjacent to the anchor plate. These components may be formed as regions of a continuous sheet of material or assembled from individually-produced parts. The resulting bracket is an incompletely tubular structure in which the support foot is configured to translate upon impact to contact a rigid surface such as the anchor plate to assume a stabilized supporting configuration. If force is applied that is greater than the supporting configuration may withstand, the bracket may be configured to further deform of collapse to absorb additional impact energy.

In some energy-absorbing brackets of the invention, the support foot may be positioned adjacent to the anchor plate and substantially parallel to the direction of an anticipated impact. Further, the support foot may include a translating arm extending from the flex region and a foot region extending from a terminal end of the translating arm such that it is positioned adjacent to the anchor plate. In some brackets, the support foot may be positioned adjacent to the anchor plate such that it is substantially parallel to the direction of an anticipated impact.

The brackets of the invention generally assume a stabilized supporting configuration when a force is applied to them. The supporting configuration is often characterized by the engagement of a foot portion of the support foot contacting a substantially rigid surface such as an anchor plate, attachment mechanism, or surface to which the bracket is attached. In some brackets according to the invention, the anchor plate of the bracket may further include a locking ridge to allow more stable engagement of the support foot. In addition, the foot region of the support foot may be positioned substantially perpendicular to the anchor plate.

In some alternative designs of the brackets of the invention, the foot region of the support foot may be generally rounded in shape. In other alternative designs, the support foot may include an intermediate foot projecting from the support foot to further stabilize the bracket. Such an intermediate foot may simply comprise a fold of the translating arm portion of the support foot. The intermediate foot may be positioned to abut the anchor plate, an attachment projecting from the anchor plate, an extension or other arm of the bracket, or another rigid surface.

Brackets of the invention may be constructed using a variety of techniques, including stamping, folding, extrusion (often with subsequent processing such as cutting of gaps), and assembly of individual components using methods known in the art. The energy-absorbing brackets may be constructed to have walls of a uniform thickness. Such brackets may be manufactured by a technique such as stamping from a single sheet of material. The brackets may be constructed of a variety of materials, including aluminum, steel, and other rigid materials known in the art such as plastic.

The anchor plates of the brackets of the invention may be configured to allow mounting of the bracket to a vehicle surface. In some configurations, the anchor plate comprises at least one mounting bore for mounting the bracket to a structure such as a vehicular pillar. Alternate mounting strategies and techniques may be used, including mounting using alternate faces of the bracket, or even suspending the bracket in place by its ends.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 3D, is not intended to limit the scope of the invention, as claimed, but is merely representative of presently preferred embodiments of the invention.

The invention thus includes brackets used to absorb the impact of a vehicle occupant with a vehicle structure. In specific embodiments of the invention, the bracket is configured for use in a vehicular pillar such as a vehicular A-pillar, and may be configured to absorb the impact of a head and/or upper body portion of a vehicle occupant with the vehicular pillar.

Figure 1:
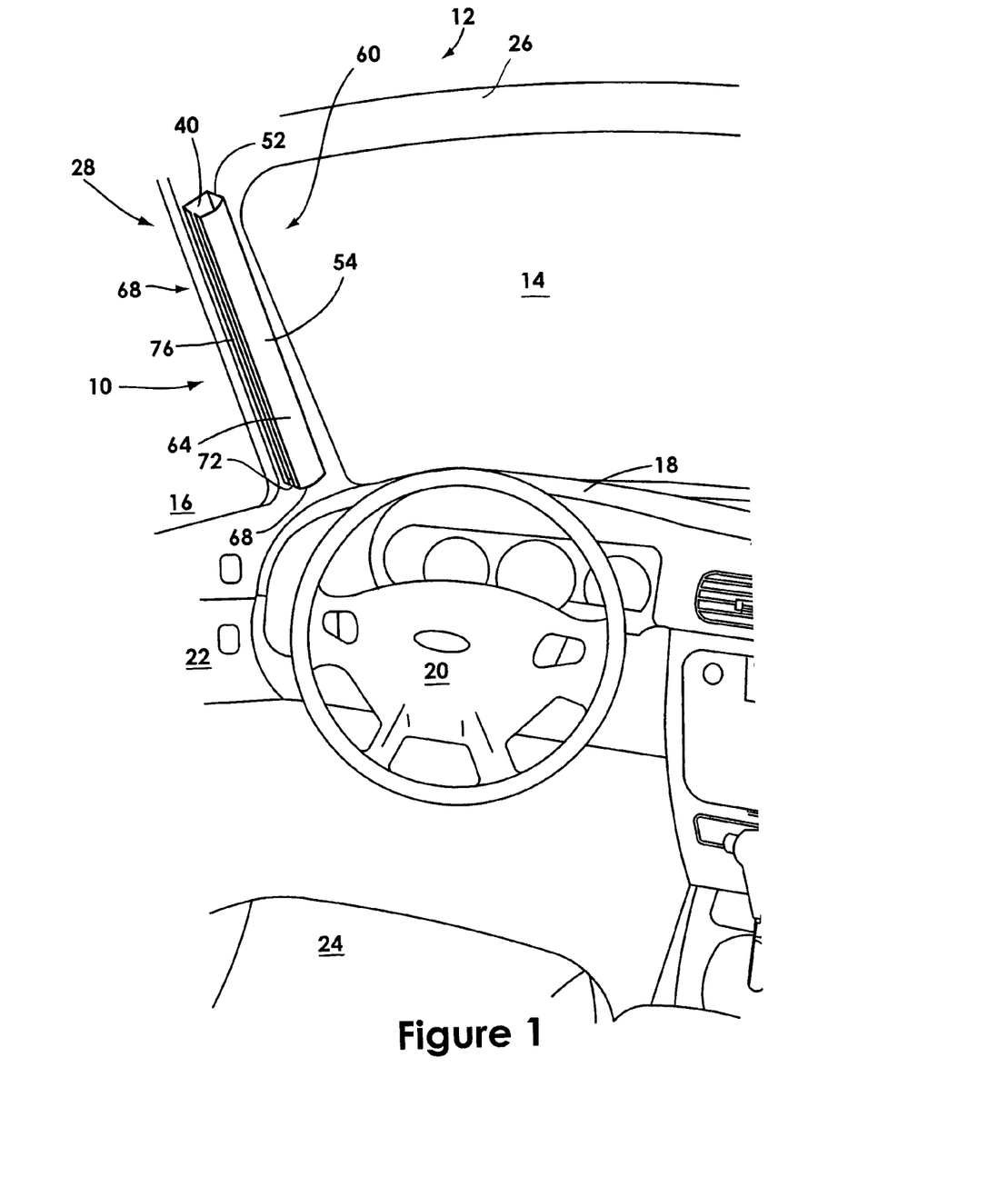
FIG. 1 is a partial perspective view of a portion of the interior of a vehicle showing an energy-absorbing bracket according to the invention placed in a vehicle pillar.

Referring first to FIG. 1, a partial perspective view of a portion of the interior of a vehicle 12 is depicted. The interior of the vehicle 12 is defined by a roof 26, a windshield 14, a door 22, and a dashboard 18, which surround a front seat 24 where a vehicle occupant may be positioned. The vehicle 12 further includes a steering wheel 20 positioned in front of the front seat 24. The roof 26 is supported in part by a vehicle A-pillar 28 which suspends the roof above the body of the vehicle 12. The A-pillar 28 further serves to separate the windshield 14 from the door 22 and side window 16. In FIG. 1, the interior of the pillar 28 is shown open to expose an energy-absorbing bracket 10 of the invention placed within to absorb impacts received by the pillar during circumstances such as collisions.

The energy-absorbing bracket 10 of the invention is shown mounted to the vehicle 12 within the A-pillar 28. The bracket 10 of the invention is an incompletely tubular structure mounted within a vehicular pillar such as the A-pillar 28. The bracket 10 is capable of absorbing an impact to a pillar. The bracket 10 comprises several segments which may be constructed out of a continuous sheet of material such as a metal, plastic, or other material shaped to form the bracket 10. Alternately, the bracket 10 may be constructed of multiple components produced separately and later joined to each other to produce the bracket 10.

The bracket 10 may include multiple segments (in the case of a bracket constructed of a continuous sheet of material), or components (in the case of a bracket constructed of multiple components). The bracket 10 may be constructed in either manner within the scope of the invention. The discussion of FIGS. 1–2D which follows may be applied by one of ordinary skill in the art to both methods of construction.

The bracket 10 of FIG. 1 may first include an anchor plate 40 which may be used to mount the bracket 10 within a pillar 28 of the vehicle 12. The anchor plate 40 is shown positioned on an interior surface of the pillar 28 directly opposite the passenger compartment of the vehicle 12. In some embodiments of the invention, the bracket 10 could be configured to be mounted to a sidewall of the pillar 28, to an outward-facing surface of the pillar 28, or to be suspended in the pillar 28 by means such as by attachments at its ends.

In this embodiment of the bracket 10, the anchor plate 40 is continuous with an extension arm 52. The extension arm 52 extends generally outward away from the anchor plate 40. In FIG. 1, the extension arm 52 is shown to extend away from the anchor plate 40 in a substantially perpendicular fashion. In alternate brackets of the invention, the extension arm 52 may do so at a non-perpendicular angle. The length of the extension arm 52 in part determines the volume of the bracket 10, and thus may be varied to change the total size of the bracket 10. Within the scope of the invention, the length of the extension arm 52 may be varied according to the size and available volume of a specified vehicular pillar 28 to provide a bracket 10 capable of being mounted within the pillar 28 and capable of absorbing impacts to the pillar 28. Modifications to the shapes of the segments or components of the brackets of the invention are also contemplated to provide brackets which fit within vehicle pillars which taper, arc, or otherwise deviate from forms with parallel straight edges.

In bracket 10 of FIG. 1, the extension arm 52 is continuous with a flex region 54. More specifically, the extension arm 52 culminates in an angled flex region 54, which then projects outwardly to form a support foot 60. The flex region 54 may serve as a somewhat flexible transition between the extension arm 52 and the support foot 60 which allows relative motion of the components of the bracket 10. In some embodiments of the bracket 10, the flex region 54 is configured to deform when a force is applied to the support foot 60 or other portion of the bracket 10. This deformation allows the support foot 60 to translate to allow the bracket 10 to adopt a supporting configuration capable of receiving and dissipating additional force. The transformation of the bracket 10 from its starting configuration into its supporting configuration will be discussed in detail below.

From the flex region 54, the support foot 60 extends generally outward and downward toward the anchor plate 40 of the bracket 10. The support foot 60 first includes a translating arm 64 extending from the flex region 54 which may be configured to bend, deform, or travel when the bracket 10 is impacted. The support foot 60 next includes a foot region 68. The foot region 68 is generally configured to stabilize the bracket 10 in its supporting configuration. The translating arm 64 may have a length determined to place the foot 68 of the support foot 60 such that after a force is applied and the support foot 60 translates, the foot region 68 contacts a specific point. Generally the foot region 68 is positioned adjacent to, but not in direct contact with, a rigid structure such as the anchor plate 40 of the bracket 10 or a portion of the vehicle 12 such as the pillar 28 to which the bracket 10 is mounted.

When a force is applied to the bracket 10, the support foot 60 translates across a gap 70 such as a slot 72, placing the foot 68 in contact with the rigid structure. As mentioned above, the rigid structure may be a structure such as anchor plate 40 of the bracket, or a region of the pillar 28 to which the bracket 10 is attached. After the support foot 60 has translated across the gap 70 and the foot region 68 has made contact with the rigid structure, the bracket 10 is described as having assumed a supporting configuration. The bracket 10, when in its supporting configuration, is capable of receiving and dissipating additional force. Upon application of forces above the tolerance of the bracket in its supporting configuration, the bracket 10 may collapse, further dissipating the force.

Figures 2A, 2B:
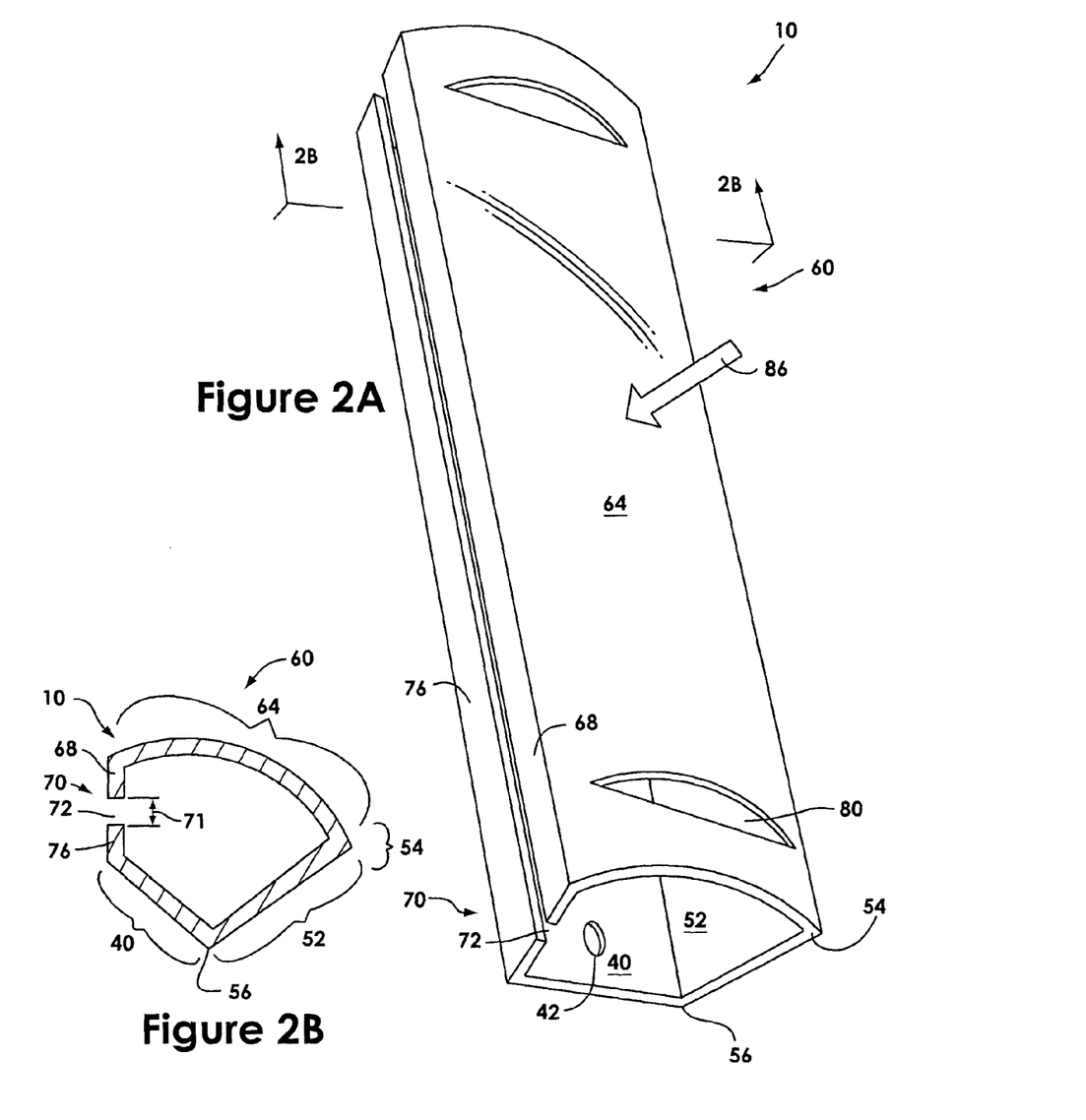
FIG. 2A is an isolated perspective view of an energy absorbing-bracket according to FIG. 1.
FIG. 2B is a cross-sectional view of the energy-absorbing bracket of FIG. 2A taken at line 2B—2B of FIG. 2A.

Referring now to FIG. 2A, the bracket 10 of FIG. 1 is shown in perspective, isolated from the vehicle 12 of FIG. 1. In FIG. 2A, the bracket 10 is presented with the support foot 60 facing outward. The support foot 60 includes a mounting bore 80 for mounting the bracket 10 to a structure such as a vehicular trim panel. This embodiment of the energy-absorbing bracket 10 of the invention is configured to receive a force 86 (represented by an arrow) on the support foot 60. In this bracket 10, the support foot is positioned substantially opposite of the anchor plate 40. In alternate brackets according to the invention, the anchor plate 40 may be placed adjacent to the support foot 60, with the extension arm 52 being relocated. In some brackets, the function of the anchor plate 40 may conceivably be assumed by the support foot 60.

According to the invention, energy-absorbing brackets may be designed to receive a force 86 produced by an impact occurring in a range of positions along the support foot 60. The illustrated orientation of the force 86 is only one such position. It should additionally be noted, however, that energy-absorbing brackets may be produced within the scope of the invention which are configured to receive a force such as 86 on a component of the bracket 10 other than the support foot 60.

As noted when discussed in relation to FIG. 1, the bracket 10 of FIG. 2A includes an anchor plate 40, an extension arm 52, and a support foot 60. The anchor plate 40 is used for mounting the bracket 10 of the invention to a vehicle such as 12 of FIG. 1. The anchor plate 40 of FIG. 2A includes attachment bores 42 for this purpose. Other alternate mechanisms may be used instead of bores 42. The brackets 10 of the invention may be suitably mounted in a variety of ways known of one of ordinary skill in the art. The extension arm 52 of the bracket 10 projects away from the anchor plate 40. The extension arm 52 then joins the support foot 60 at a flex region 54.

The support foot 60 of bracket 10 includes a flex region 54, a translating arm 64, and a foot 68. The flex region 54 joins the support foot 60 to the extension arm 52, and may be configured to deform when a force such as 86 is applied to the bracket 10. Such deformation may be adapted to allow the translating arm 64 to move in order to place the foot 68 in contact with a rigid surface. In the bracket 10 of FIG. 2A, the foot 68 is configured translate across a gap 72 to abut a locking ridge 76 when a force such as 86 has been applied to the bracket 10, causing the translating arm 64 to close the gap 70, and causing the foot 68 to engage the locking ridge 76. In this configuration, the bracket is described as being in its supporting position, in which the bracket may support additional force without additional deformation. Brackets such as 10 of the invention may be configured to deform further, or even to collapse or fail to absorb and/or dissipate additional force.

The energy-absorbing brackets of the invention such as bracket 10 are configured to receive a force 86 from an outside source, change shape by allowing the support foot 60 to be deflected from its original position and translate through space until it contacts the rigid surface to which the bracket 10 is mounted. At this point, the foot portion 68 of the support foot 60 is in contact with the rigid surface. In the embodiment of the energy-absorbing bracket 10, the foot portion 68 of the support foot 60 comes to rest against a surface such as the anchor plate 40, a locking ridge 76 extending from the anchor plate 40, or another rigid surface to which the bracket 10 is attached.

In bracket 10 shown in FIG. 2A, the foot region 68 may be placed in contact with the locking ridge 76 after the bracket is impacted. In some embodiments of the bracket 10, the support foot 60 may be configured to displace such that the foot region 68 is placed to impact the locking ridge 76. In other embodiments of the bracket 10, the support foot 60 may be configured to displace such that the foot region 68 of the support foot 60 will rest on either side of the locking ridge 76. In those brackets 10 in which the locking ridge 76 falls laterally toward the inside of the bracket 10, subsequent force applied to the bracket 10 may push the foot region 68 up against the locking ridge 76. This forms a more stable bracket 10 when in the supporting configuration. Upon the application of sufficient loading, the bracket 10 may deform further by being crushed in order to absorb additional energy. In alternate embodiments, the foot portion 68 may fall outside the locking ridge 76. The resulting structure may be more susceptible to deformation and crushing, rendering it suitable for use in situations anticipating a lesser force.

Referring now to FIG. 2B, a cross-sectional view of the energy-absorbing bracket of FIG. 2A taken at line 2B—2B of FIG. 2A is shown. FIG. 2B shows the relationship of the various segments of the bracket 10 to each other in the pre-impact state of the bracket 10. Specifically, as described above, the bracket 10 is an incompletely tubular structure having an anchor plate 40, an extension arm 52, and a support foot 60. The support foot 60 includes a flex region 54, a translating arm 64, and a foot 68. The anchor plate 40 further includes a locking ridge 76 that may engage the foot 68 upon deformation of the bracket 10.

As noted above, the bracket 10 of the invention may be produced using many methods. Some suitable methods include folding a continuous sheet of a material such as a metal into the shape of the bracket 10, assembling preformed individual components into the bracket 10 by attaching them to each other, and producing a tubular structure having the general shape of the bracket 10 and rendering it partially-tubular by removing a strip of material to produce a gap 70 such as the slot 72. Other suitable manufacturing methods will be known to one of skill in the art.

In FIG. 2B, bracket 10 of FIG. 2B is shown to have non-hollow walls with constant thickness. These features may be used to permit brackets of the invention to be manufactured using high-speed, and often lower-cost manufacturing methods such as stamping or folding. In addition to the above, the brackets of the invention may be made from a wide variety of materials, including, but not limited to, metals such as steel, aluminum, etc., as well as various plastics.

In FIGS. 2A and 2B, the gap 70 is shown to be a slot 72. In embodiments of the bracket 10 made by folding, the characteristics of the gap 70 may be created by regulating the folding process and the size of the original material being transformed into the bracket 10. In other situations, the bracket 10 could be formed (as by extrusion) as a solid tubular structure. The gap 70 could be created subsequent to the formation of the body of the bracket 10 by cutting a slot 72 in the bracket 10. The slot 72 could be oriented to be substantially parallel with the long vertical axis of the energy-absorbing bracket 10.

In some brackets of the invention, the gap 70 has an even width 71. In other energy-absorbing brackets according to the invention, the gap 70 may have an uneven or variable width 71 which varies along the length of the bracket 10. Such a configuration may be desired to allow the bracket to redirect force, have multiple potential (alternative or sequential) supportive configurations, or to tune the characteristics of the bracket when the bracket is placed in its supportive configuration.

Figures 2C, 2D:
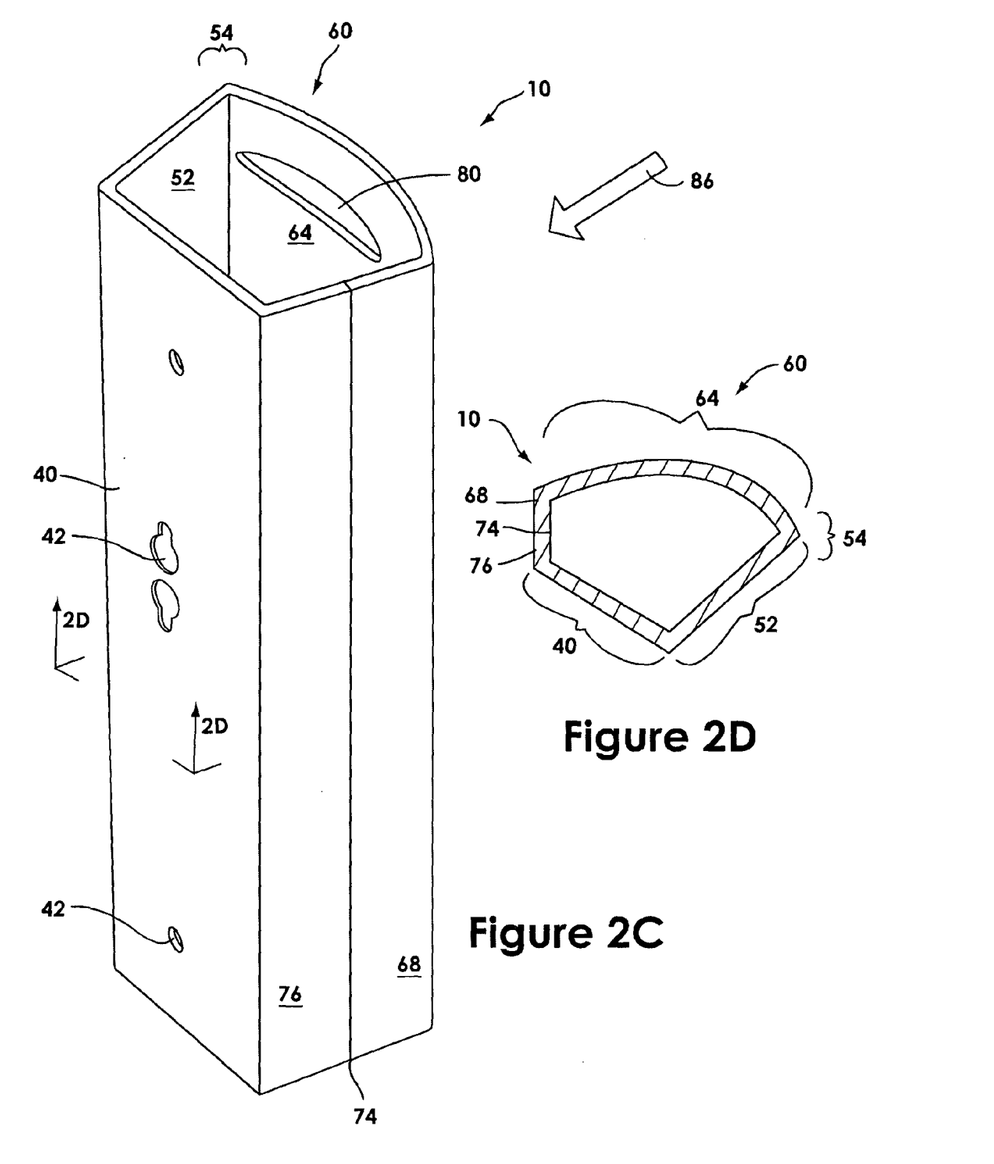
FIG. 2C is a rotated perspective view of the energy-absorbing bracket of FIG. 2A shown in a supporting configuration assumed when the bracket deforms in response to the application of a force.
FIG. 2D is a cross-sectional view of the energy-absorbing bracket of FIG. 2C taken at line 2D—2D of FIG. 2C.

Referring now to FIG. 2C a perspective view of the energy-absorbing bracket 10 of FIG. 2A is shown rotated to present an alternate view of the bracket 10. In addition, the bracket 10 is shown in its supporting configuration, the translating arm 64 having displaced such that the foot 68 abuts the locking ridge 76 at an interface 74. This view of the energy-absorbing bracket 10 places the anchor plate 40, portions of the support foot 60 including a mounting bore 80 for mounting the bracket 10 to a structure such as a vehicular trim panel, and the interface 74 in the foreground. First, the anchor plate 40 is shown to include features such as attachment bores 42 to allow the bracket 10 to be installed in a vehicle. One of ordinary skill in the art will recognize that many other suitable mechanisms and means for attaching the bracket 10 to a vehicle are known in the art, and as a result, may be integrated into the bracket 10 within the scope of the invention. The anchor plate 40 may further include a member for engaging the support foot 60 when the bracket 10 is deflected from its original configuration to its supportive configuration. In FIGS. 1–2D, the energy-absorbing bracket 10 is shown to include locking ridge 76 projecting from the anchor plate 40. One of ordinary skill in the art would understand many viable alternate configurations for the interface 74 of the locking ridge 76 and the foot 68. In other configurations of the energy-absorbing brackets of the invention, the support foot 60 may be configured to engage a surface such as the anchor plate 40 or a surface of the vehicle to which the bracket 10 is mounted in order for the bracket 10 to assume a more supportive configuration.

Referring now to FIG. 2D, a cross-sectional view of the energy-absorbing bracket of FIG. 2C is shown in its supportive configuration taken at line 2D—2D of FIG. 2C. The bracket 10 of FIG. 2D has the same component regions as shown in FIGS. 1–2C. As in FIG. 2C, in FIG. 2D the bracket is shown as it would look in cross-section after being deformed from its original configuration to its supportive configuration. As discussed briefly above, the energy-absorbing brackets of the invention such as the bracket 10 of FIG. 2D are configured to receive a force and subsequently undergo an initial deformation to assume a supportive configuration. Following this initial deformation, the energy-absorbing brackets of the invention may absorb additional force before further deforming or failing. The amount of additional force which may be absorbed may in part be regulated by the choice of the type and thickness of the material used to produce the brackets of the invention. The amount of additional force which may be absorbed may additionally be regulated by the shape and structure of the supporting configuration as well as the interface 74 between the foot portion of the support foot 60 of the bracket 10, and the anchor plate 40, locking ridge 76, or other rigid surface (including surfaces of the vehicle to which the bracket 10 is mounted).

In FIG. 2D, this interface 74 formed by the deformation of the bracket 10 placing the foot 68 in abutment to the locking ridge 76 is shown to be a directly-aligned interface of the foot 68 and the locking ridge 76. As noted above, this interface is formed as the bracket 10 is deformed by the application of a force 86 to the bracket 10. In some situations, the deformation of the bracket 10 may be predictable to the extent that mechanical interlocking features may be provided to strengthen the interface 74. Alternatively, the placement of the foot 68 relative to the anchor plate 40 may be controlled to provide a stable supportive configuration. Alternate embodiments of the brackets of the invention are shown in FIGS. 3A–3D to illustrate various configurations of the brackets of the invention.

Figure 3A:
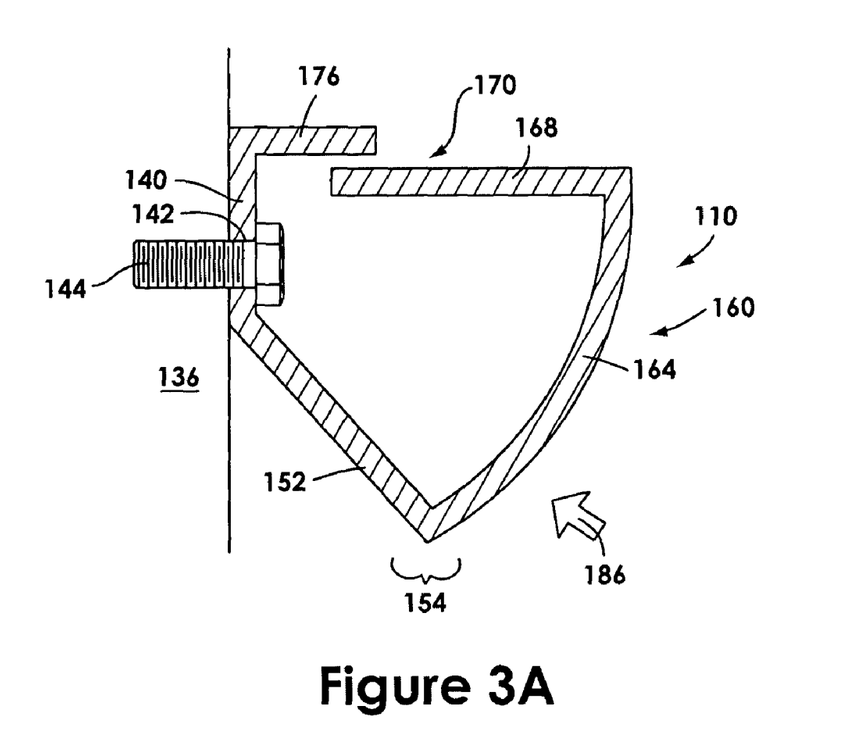
FIG. 3A is a plan view of a cross-section of an alternate embodiment of an energy-absorbing bracket of the invention shown in a pre-impact configuration.

Referring first to FIG. 3A, a first alternative energy-absorbing bracket 110 of the invention is shown in a cross-sectional view. Similar to bracket 10 above, bracket 110 of FIG. 3A includes an anchor plate 140, an angled extension arm 152, and a support foot 160. The extension arm 152 is shown to protrude from the anchor plate 140 at an angle. The support foot 160 is shown to include a flex region 154, a translating arm 164, and a foot 168. The foot 168 of the support foot 160 is separated from a locking ridge 176 (here shown to be continuous with the anchor plate 140) by a gap 170.

The gap 170 of bracket 110 differs from that of bracket 10 of FIGS. 1–2D in that the locking ridge 176 and the foot 168 overlap each other. As with bracket 10 of FIGS. 1–2D, bracket 110 is designed to receive a force such as that designated by arrow 186. In response to such a force 186, the support foot 160 of the bracket 110 will translate inwardly, pressing the foot 168 against the anchor plate 140 and/or the locking ridge 176. Since the foot 168 of the support foot 160 is situated internally relative to the locking ridge 176, such placement results in the bracket 110 assuming a tubular supporting configuration which is stabilized against additional force.

The bracket 110 is shown attached to a surface 136. As shown in the previous Figures, this surface may be an interior surface of a vehicular pillar. In other circumstances, this surface may be another surface of a vehicle such as a door, side panel, dashboard, glove box, etc., which may be contacted by a vehicle occupant during a collision event. In some situations, the bracket 110 may be mounted by passing a bolt 144 through an attachment bore 142 found in the anchor plate 140. Other mounting methods known to one of skill in the art may be used with energy-absorbing brackets within the scope of the invention.

As noted above, the bracket 110 may absorb a force such as a force designated by arrow 186. The bracket 110 may be configured to receive a force on the support foot 160 at an angle, as shown in FIG. 3A, to receive a force from another direction, or to receive a force on a different face of the bracket 110.

Figure 3B:
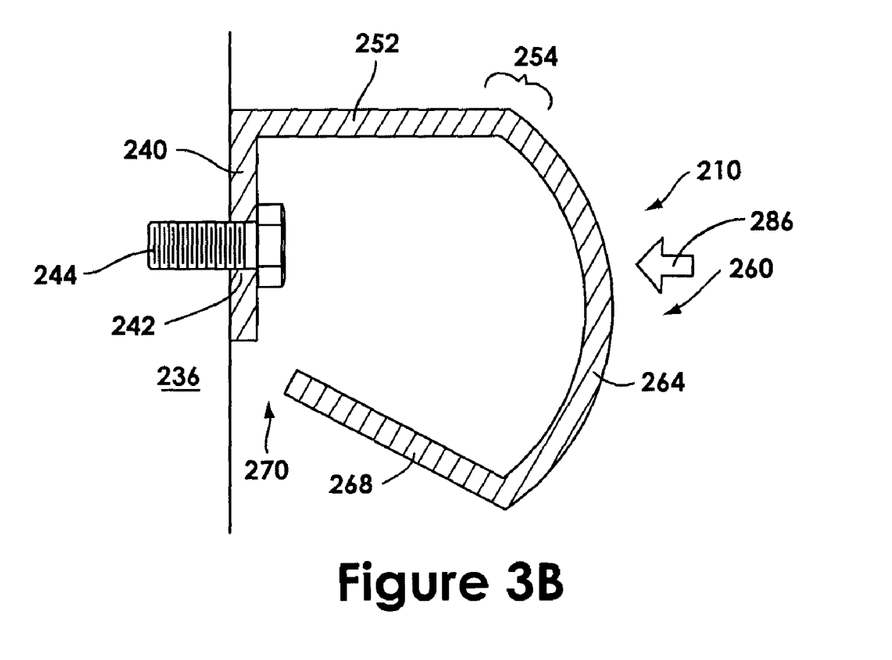
FIG. 3B is a plan view of a cross section of another embodiment of an energy-absorbing bracket of the invention shown in a pre-impact configuration.

Referring to FIG. 3B, another energy-absorbing bracket 210 of the invention is shown in a cross-sectional view. As with the previously-discussed brackets 10, 110 of the invention, bracket 210 of FIG. 3B includes an anchor plate 240, an extension arm 252, and a support foot 260. The support foot 260 is shown to include a flex region 254, a translating arm 264, and a foot 268. The foot 268 of the support foot 260 is separated from the anchor plate 240 of the bracket 210 by a gap 270.

The gap 270 of bracket 210 differs from that of brackets 10 and 110 of FIGS. 1–3A. More specifically, the bracket 210 of FIG. 3A has no locking ridge such as 76 and 176 of FIGS. 1–3A. In this embodiment of the bracket 210, the foot 268 of the support foot 260 is angled inwardly and configured to be displaced across the gap 270. In various configurations, the bracket 210 may come to rest against a substantially rigid surface such as the surface 236 to which the bracket 210 has been mounted, an edge or other surface of the bracket 210 such as the anchor plate 240, or an attachment fixture such as a bolt 244 passing through an attachment bore 242 in the anchor plate 240. When the foot 268 assumes a position in contact with such a surface, the bracket 210 is said to have assumed its supporting configuration.

The bracket 210 is shown attached to a surface 236. As shown in the previous Figures, this surface may be an interior surface of a vehicular pillar. In other circumstances, this surface may be another surface of a vehicle such as a door, side panel, dashboard, glove box, etc., which may be contacted by a vehicle occupant during a collision event. In some situations, the bracket 210 may be mounted by passing a bolt 244 through an attachment bore 242 found in the anchor plate 240. Other mounting methods known to one of skill in the art may be used with energy-absorbing brackets within the scope of the invention.

As noted above, the bracket 210 may absorb a force such as a force designated by arrow 286. The bracket 210 is shown configured to receive a force on the support foot substantially perpendicular to the anchor plate 240. Alternatively, the bracket 210 may be configured to receive a force from another direction, or on a different face of the bracket 210.

Figure 3C:
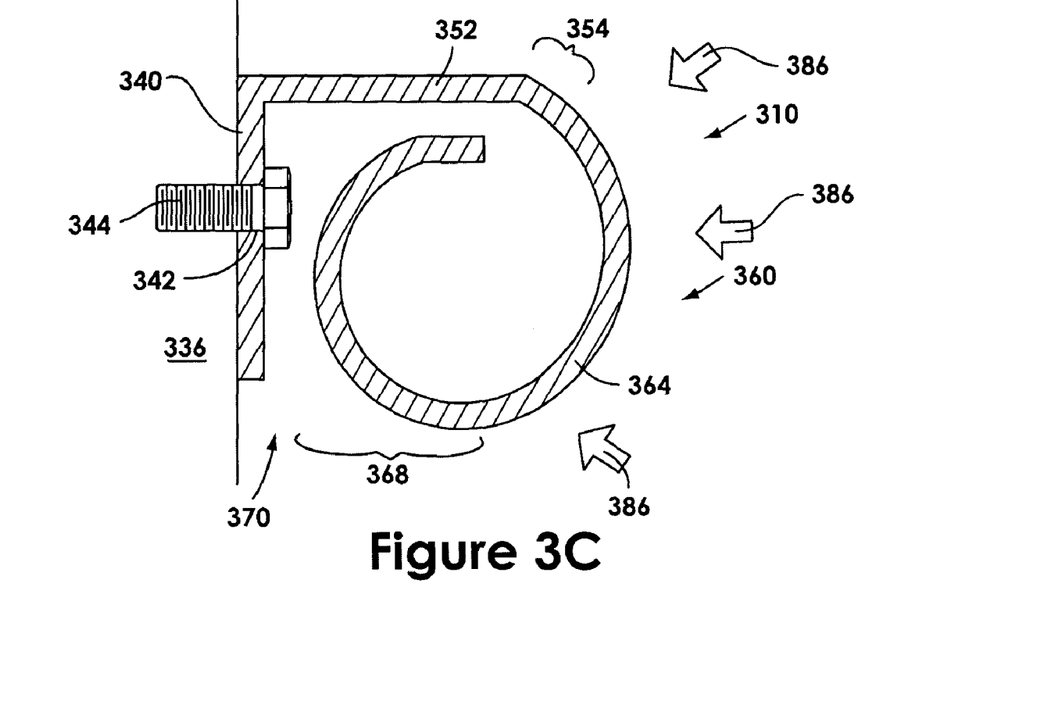
FIG. 3C is a plan view of a cross section of yet another embodiment of an energy-absorbing bracket of the invention shown in a pre-impact configuration.

Referring now to FIG. 3C, yet another alternative energy-absorbing bracket 310 of the invention is shown in a cross-sectional view. As with the previously-shown brackets 10, 110, and 210 of FIGS. 1–3B, bracket 310 of FIG. 3C includes an anchor plate 340, an extension arm 352, and a support foot 360. The support foot 360 is shown to include a flex region 354, a translating arm 364, and a curved foot 368. The curved foot 368 of the support foot 360 is shown to be separated from the anchor plate 340 by a gap 370.

Bracket 310 differs from those previously discussed in that the foot portion 368 of the support foot 360 is substantially rounded in shape. As in FIG. 3B, the bracket 310 of FIG. 3C the gap 370 incorporates no locking ridge, although the design may be varied to incorporate such a feature. The bracket 310 is designed to receive a force such as that designated by arrow 386. In response to such a force 386, the support foot 360 of the bracket 310 will translate inwardly, pressing a region of the foot 368 against a rigid surface to place the bracket 310 in a supporting configuration.

The rounded foot 368 of the bracket 310 may allow the bracket 310 to adopt a supporting configuration in response to forces received from a wide variety of directions. More specifically, in the bracket 310, the rounded foot 368 may be pressed against a variety of surfaces, including, but not limited to the anchor plate 340, extension arm 352, bolt 344, and a mounting surface 336 to form a supporting configuration. Some exemplary forces are shown as arrows 386 in FIG. 3C. One of skill in the art understands that these designate only exemplary forces, and that forces may be received from many other directions within the scope of the invention. Further, such forces may be received on surfaces of the bracket 310 other than the support foot 360 in order to place the bracket 310 into the supporting configuration.

As briefly mentioned above, the bracket 310 is shown attached to a surface 336. As shown in the previous Figures, this surface may be an interior surface of a vehicular pillar. In other circumstances, this surface may be another surface of a vehicle such as a door, side panel, dashboard, glove box, etc., which may be contacted by a vehicle occupant during a collision event. In some situations, the bracket 310 may be mounted by passing a bolt 344 through an attachment bore 342 found in the anchor plate 340. Other mounting methods known to one of skill in the art may be used with energy-absorbing brackets within the scope of the invention.

Figure 3D:
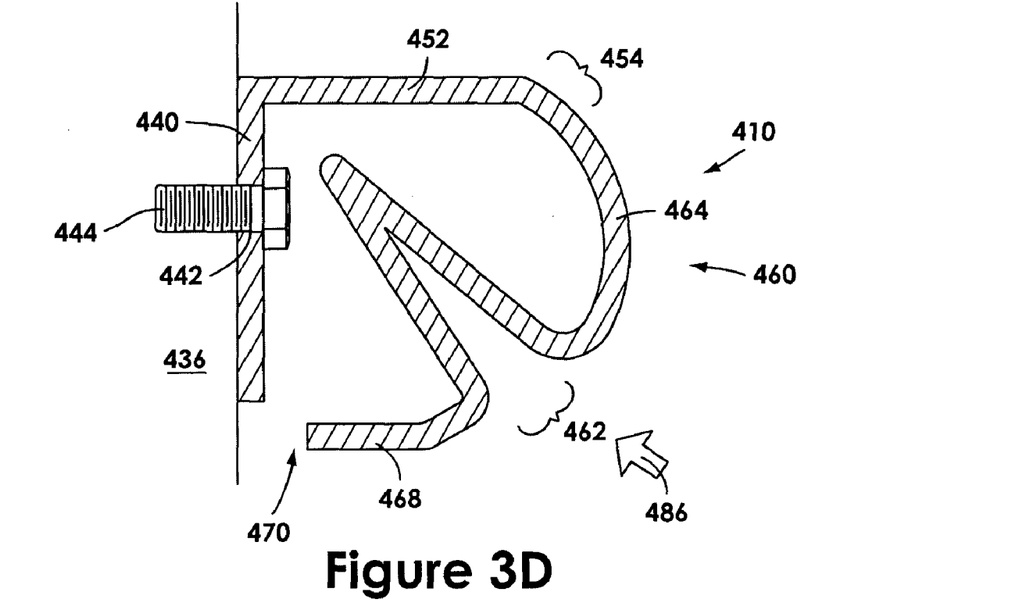
FIG. 3D is a plan view of a cross section of still another embodiment of an energy-absorbing bracket of the invention shown in a pre-impact configuration.

Referring next to FIG. 3D, another alternative energy-absorbing bracket 410 of the invention is shown in a cross-sectional view. Bracket 110 of FIG. 3D includes an anchor plate 440, an extension arm 452, and a support foot 460. The support foot 460 is shown to include a flex region 454, a translating arm 464, and a foot 468. Unlike other brackets of the invention discussed above, the bracket 410 of FIG. 3D includes an intermediate foot 462 in the form of an inwardly-projecting fold of the support foot 460. The intermediate foot 462 may extend through the center of the bracket 410 to be adjacent to a rigid surface such as the anchor plate 440, bolt 442, or extension arm 452. The support foot 460 also includes a terminal foot region 468 which may be positioned adjacent to a rigid surface such as the anchor plate 440, bolt 442, or the surface 436 to which the bracket 410 is mounted. The foot region 468 of the support foot 460 is separated from the anchor plate 440 by a gap 470.

The support foot 460 is separated from the anchor plate 440 by a gap 470. The bracket 410 of FIG. 3D is designed to receive a force such as that designated by arrow 486. In response to such a force 486, the support foot 460 of the bracket 410 will translate inwardly, pressing the foot 468 and the intermediate foot 462 against surfaces such as the anchor plate 440, extension arm 452, bolt 444, or mounting surface 436. The inclusion of the intermediate foot 462 may allow the absorption of additional force before the bracket collapses or otherwise fails. In some embodiments, the intermediate foot 462 may extend slightly further into the center of the bracket 410 than the foot 468. This permits the bracket 410 to assume a first supporting configuration when a first force is applied to the bracket 410, and to then subsequently assume a second supporting configuration when an additional force drives the terminal foot 468 comes into contact with a rigid surface such as the anchor plate 440, rigid mounting surface 436, or attachment bolt 444. Further, the fold comprising the intermediate foot 462 may serve to direct eventual crumpling or failure of the bracket 410 when a force is applied to the bracket 410 that is sufficient to overcome the structural stability of both of the supporting configurations.

The bracket 410 is shown attached to a surface 436. As shown in the previous Figures, this surface may be an interior surface of a vehicular pillar. In other circumstances, this surface may be another surface of a vehicle such as a door, side panel, dashboard, glove box, etc., which may be contacted by a vehicle occupant during a collision event. In some situations, the bracket 410 may be mounted by passing a bolt 444 through an attachment bore 442 found in the anchor plate 440. Other mounting methods known to one of skill in the art are included in the scope of the invention.

As noted above, the bracket 410 may absorb a force such as a force designated by arrow 486. The bracket 410 may be configured to receive a force on the support foot 460 at an angle, as shown in FIG. 3D, or may be configured to receive a force from another direction, and on a different face of the bracket 410.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A bracket for absorbing energy comprising:
   an anchor plate;
   a locking ridge extending from the anchor plate at a non-perpendicular angle to the anchor plate;
   an extension arm continuous with and extending from the anchor plate; and
   a support foot linked to the extension arm by a flex region and positioned adjacent to the anchor plate, wherein the bracket is an incompletely tubular structure having an asymmetrical cross-section, and wherein the support foot is configured to translate upon impact to contact the locking ridge, the bracket being further configured to deform to absorb impact energy.

2. The bracket of claim 1, wherein the support foot is separated from the anchor plate by a gap.

3. The bracket of claim 1, wherein the support foot comprises a translating arm extending from the flex region, and a foot region extending from a terminal end of the translating arm such that it is positioned adjacent to the anchor plate.

4. The bracket of claim 3, wherein the foot region is separated from the anchor plate by a gap.

5. The bracket of claim 1, wherein the anchor plate, extension arm, flex region, and support foot of the bracket have a uniform thickness.

6. The bracket of claim 1, wherein the bracket is constructed of aluminum.

7. The bracket of claim 1, wherein the bracket is constructed of steel.

8. The bracket of claim 1, wherein the bracket is constructed of plastic.

9. The bracket of claim 1, wherein the anchor plate comprises at least one mounting bore for mounting the bracket to a vehicle structure.

10. The bracket of claim 1, wherein the support foot comprises at least one mounting bore for mounting the bracket to a vehicle structure.

11. An energy absorbing pillar structure for an automotive vehicle, comprising:
    an anchor plate;
    an extension arm continuous with and extending from the anchor plate, wherein the extension arm is straight; and
    a support foot linked to the extension arm by a flex region and comprising a translating arm, the translating arm extending from the extension arm and a foot region extending from a terminal end of the translating arm at a non-perpendicular angle to the translating arm, the support foot being configured to translate upon impact to contact the anchor plate, the energy absorbing pillar structure having a uniform thickness and being further configured to deform to absorb impact energy.

12. The energy absorbing pillar structure of claim 11, wherein the foot region is separated from the anchor plate by a gap.

13. The energy absorbing pillar structure of claim 11, wherein the anchor plate further includes a locking ridge for engaging the support foot.

14. The energy absorbing pillar structure of claim 11, wherein the anchor plate comprises at least one mounting bore for mounting the energy absorbing pillar structure to a vehicle.

15. The energy absorbing pillar structure of claim 14, wherein the support foot comprises at least one mounting bore for mounting the energy absorbing pillar structure to a vehicular trim panel.

16. The energy absorbing pillar structure of claim 11, wherein the bracket is constructed of aluminum.

17. The energy absorbing pillar structure of claim 11, wherein the bracket is constructed of steel.

18. The energy absorbing pillar structure of claim 11, wherein the bracket is constructed of plastic.

* * * * *